US010655592B2

United States Patent
Dane et al.

(10) Patent No.: US 10,655,592 B2
(45) Date of Patent: May 19, 2020

(54) CONTROL STRATEGIES FOR LEAN BURN SPARK IGNITION ENGINES

(71) Applicant: Cummins Inc., Columbus, IN (US)

(72) Inventors: Marten H. Dane, Columbus, IN (US); Richard A. Booth, Columbus, IN (US); Balaji Sampathnarayanan, Bloomington, IN (US); Jagruti Tembe, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/013,304

(22) Filed: Jun. 20, 2018

(65) Prior Publication Data
US 2018/0298870 A1    Oct. 18, 2018

Related U.S. Application Data

(63) Continuation of application No. PCT/US2016/022335, filed on Mar. 14, 2016.
(Continued)

(51) Int. Cl.
| | |
|---|---|
| *F02P 5/00* | (2006.01) |
| *F02P 5/04* | (2006.01) |
| *F02P 5/15* | (2006.01) |
| *F02P 5/145* | (2006.01) |

(Continued)

(52) U.S. Cl.
CPC .............. *F02P 5/045* (2013.01); *F02P 5/04* (2013.01); *F02P 5/145* (2013.01); *F02P 5/15* (2013.01);
(Continued)

(58) Field of Classification Search
CPC ..... F02D 37/02; F02P 5/00; F02P 5/04; F02P 5/1455; F02P 5/045; F02P 5/152
(Continued)

(56) References Cited

U.S. PATENT DOCUMENTS

| | | |
|---|---|---|
| 4,587,938 A | 5/1986 | Kobayashi |
| 5,411,000 A | 5/1995 | Miyashita et al. |

(Continued)

FOREIGN PATENT DOCUMENTS

| | | |
|---|---|---|
| EP | 0288056 A2 | 10/1988 |
| EP | 2772628 | 9/2014 |

(Continued)

OTHER PUBLICATIONS

Search Report and Written Opinion, PCT Appln. No. PCT/US16/22335, dated Jun. 2, 2016, 10 pgs.
(Continued)

*Primary Examiner* — John Kwon
(74) *Attorney, Agent, or Firm* — Taft Stettinius & Hollister LLP

(57) ABSTRACT

A system for controlling one or more conditions associated with combustion events in one or more cylinders of an engine while generally maintaining a spark timing value at a relatively constant value. The system includes a controller configured to determine one or more temporary adjustments to the spark timing value that brings one or more conditions, such as, for example, engine knock levels and/or NOx levels to around, or within, a corresponding target or threshold level(s). Following selection and implementation of one of the adjustments to the spark timing value, the controller implement adjustments to the adjusted spark timing value to return to a target spark timing value. The controller can further be adapted to determine adjustments to the air-to-fuel ratio to accommodate operation of the engine at the target spark timing value while maintaining the one or more conditions at or below the corresponding threshold or target level(s).

20 Claims, 6 Drawing Sheets

Related U.S. Application Data

(60) Provisional application No. 62/273,042, filed on Dec. 30, 2015.

(51) Int. Cl.
 *F02P 5/152* (2006.01)
 *F02D 41/00* (2006.01)

(52) U.S. Cl.
 CPC .............. *F02P 5/1502* (2013.01); *F02P 5/152* (2013.01); *F02D 41/00* (2013.01); *Y02T 10/46* (2013.01)

(58) Field of Classification Search
 USPC ............. 123/406.15–406.17, 406.29, 406.47
 See application file for complete search history.

(56) References Cited

U.S. PATENT DOCUMENTS

| | | | |
|---|---|---|---|
| 6,980,903 B2 | 12/2005 | Daniels et al. | |
| 7,913,675 B2 | 3/2011 | Bailey et al. | |
| 2002/0185107 A1 | 12/2002 | Kubesh et al. | |
| 2004/0084019 A1 | 5/2004 | Zhu et al. | |
| 2010/0012079 A1 | 1/2010 | Nakazono et al. | |
| 2012/0073543 A1 | 3/2012 | Hagari et al. | |
| 2016/0237923 A1* | 8/2016 | Kitagawa | F02D 35/023 |
| 2016/0363057 A1* | 12/2016 | Cygan, Jr. | F02D 13/0207 |
| 2017/0037791 A1* | 2/2017 | Kitagawa | F02D 35/023 |
| 2017/0314499 A1* | 11/2017 | Urano | F02D 41/1475 |

FOREIGN PATENT DOCUMENTS

| | | |
|---|---|---|
| JP | H03 130557 A | 6/1991 |
| JP | H08 35440 A | 2/1996 |
| WO | 2013000030 | 1/2013 |

OTHER PUBLICATIONS

Extended EP Search Report, EP Appln. No. 16882212.0, dated Jan. 14, 2020, 11 pgs.

* cited by examiner

CONTROL STRATEGIES FOR LEAN BURN SPARK IGNITION ENGINES

CROSS REFERENCE TO RELATED APPLICATIONS

This application is a continuation patent application of International Patent Application Serial No. PCT/US16/22335, filed Mar. 14, 2016, which claims priority to U.S. Provisional Patent Application Ser. No. 62/273,042, filed Dec. 30, 2015, which are hereby incorporated by reference in their entireties.

BACKGROUND

Embodiments of the present application generally relate to control strategies for lean burn spark ignition engines.

The quantity of nitrogen oxides (NOx) generated during operation of internal combustion engines, including, for example, lean burn spark engines, can be attributed, at least in part, to in-cylinder temperatures. Accordingly, certain attempts to control NOx generation have included controlling the temperature of the associated combustion event and/or the in-cylinder temperature. Other systems may attempt to control in-cylinder temperatures by controlling in-cylinder pressure and/or flame speeds.

In-cylinder temperatures and the properties of the fuel that is utilized during combustion events can also generally be correlated to the presence, and potential increases, of engine knock. Moreover, as in-cylinder temperatures increase, both the instances of engine knock and the quantity of generated NOx can also increase. While engine knock can be attributed to a variety of factors, for at least certain types of fuel used with lean burn spark engines, such as, for example, engines that utilize natural gas as a fuel, engine knock can be attributed to changes in fuel properties. Such changes in fuel properties can include, but is not limited to, a methane number (MN) of a natural gas fuel and the presence and/or quantity of diluents in fuel, such as $CO_2$, among other diluents.

Current control strategies that attempt to reduce NOx generation in lean burn spark ignition engines often target a fixed NOx level. Such strategies can include sensing a NOx level, such as, for example, by NOx sensors, and, if necessary and based on the sensed NOx levels, adjusting the air-to-fuel mixture delivered to the cylinders in at least an attempt to adjust the NOx levels. Other approaches may also be employed that estimate the NOx level, such as, for example, a Torque Over Boost (TOB) method. Yet, such controls may not accommodate, or adjust to, changes in certain conditions, such as, for example, a change in one or more properties of the fuel being supplied for combustion in the engine. Moreover, such changes in the property(ies) of the fuel can adversely impact efforts to adjust operations of the engine system that seek to adjust NOx levels.

Further, current controls often change or adjust certain engine operations based at least in part on engine knock margin. However, the different manners in which NOx and engine knock levels have been controlled often results in conflict between the control strategies for NOx levels and the control strategies for engine knock. Moreover, the control strategies for controlling NO x levels and for controlling engine knock levels can fight each other as the strategies attempt to attain target NOx and/or engine knock levels. Such conflicts can adversely impact not only the ability to attain such target levels, but can also adversely impact operation of the internal combustion engine.

BRIEF SUMMARY

An aspect of an embodiment of the present application is a system having a controller that is configured to determine an adjusted condition level that is based on a first condition level and a target condition level, and determine, based at least in part on the adjusted condition level, a first adjusted spark timing value. The first adjusted spark timing value can be configured to adjust a spark timing event in one or more cylinders of an engine to attain a second condition level that is around or within the target condition level. The controller can further be configured to determine a second adjusted spark timing value based on a target spark timing value and the first adjusted spark timing value and determine, based at least in part on the second adjusted spark timing value, an adjusted air-to-fuel ratio. The adjusted-air-fuel ratio can be an air-to-fuel ratio that at least assists in maintaining approximately the second condition level when the sparking timing event is operated at approximately the target spark timing value.

Another aspect of an embodiment of the present application is a system having a controller that is configured to determine a first adjustment for a spark timing event for a combustion event in one or more cylinders of an engine, the first adjustment being configured to adjust a first condition to a first adjusted condition. The controller can also be configured to determine a second adjustment for the spark timing event, the second adjustment being configured to adjust a second condition to a second adjusted condition, the second condition being a different type of condition than the first condition. Additionally, the controller can be configured to select one of the first and second adjustments for implementation to adjust the spark timing event and determine a third adjustment to the spark timing event. The third adjustment can be configured to, after adjustment of the spark timing event using one of the first and second adjustments, adjust the spark timing event to a target spark timing event. Additionally, the controller can be configured to determine, based at least in part on the third adjustment and at least one of the first and second adjusted conditions, an adjusted air-to-fuel ratio.

Another aspect of an embodiment of the present application is a method that includes determining a first adjustment to a spark timing value to satisfy a threshold NOx level, and determining a second adjustment to the spark timing value to satisfy a threshold engine knock level. The spark timing can be adjusted using one of the first and second adjustments. The method can also include determining a third adjustment for the spark timing value to, after adjusting the spark timing value using one of the first and second adjustments, adjust the spark timing value to approximately a target spark timing value. Additionally, the method can also include determining, based on at least the target spark timing value and maintaining at least one of the threshold NOx level and the threshold engine knock level, an adjusted air-to-fuel ratio.

BRIEF DESCRIPTION OF THE DRAWINGS

The description herein makes reference to the accompanying figures wherein like reference numerals refer to like parts throughout the several views.

Figure 1:
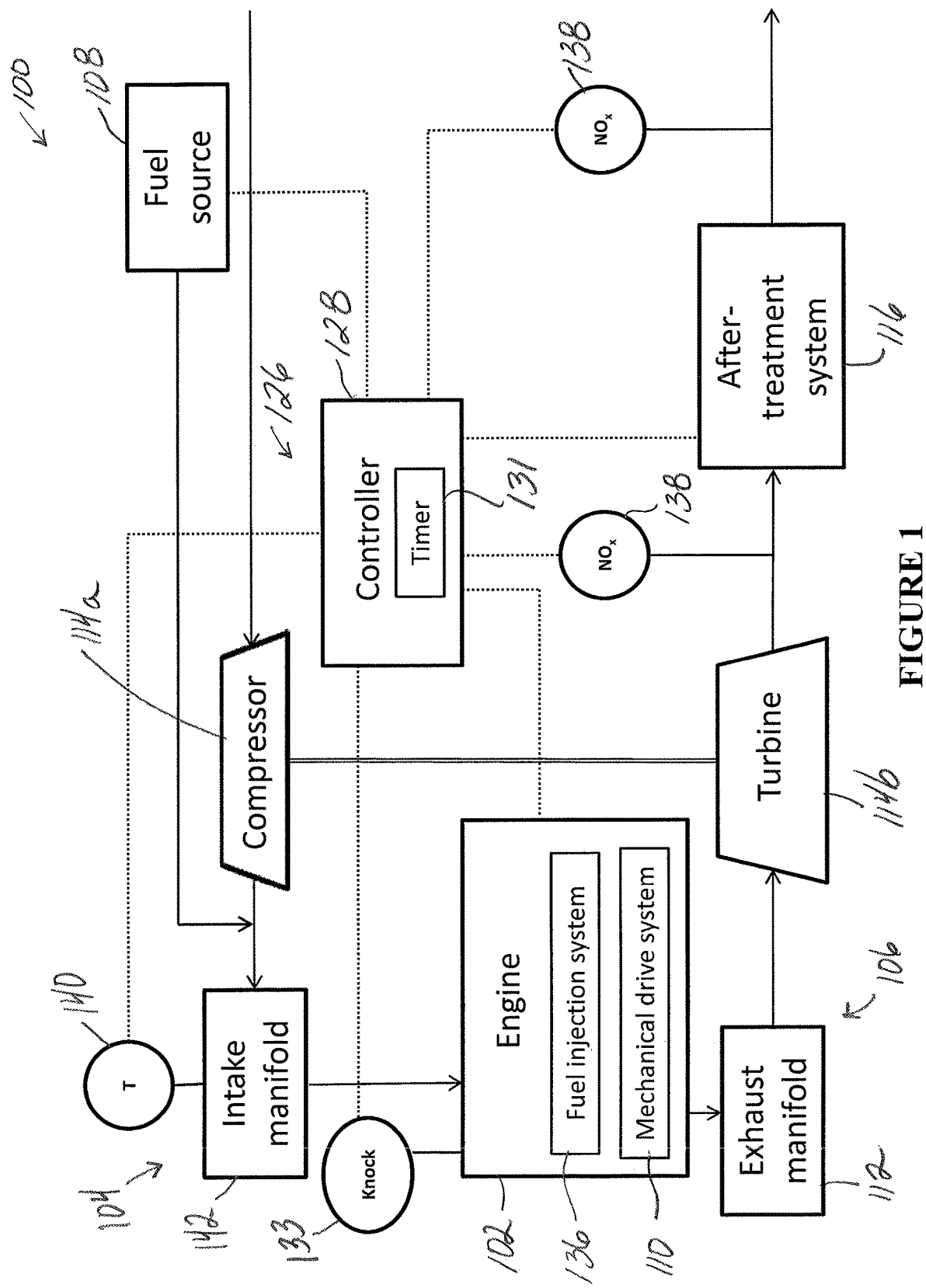
FIG. 1 illustrates a schematic block diagram of an exemplary internal combustion engine system that includes a lean burn spark ignition engine.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Embodiments of the present application include a control strategy that can at least assist in maintaining engine knock and NOx emissions below corresponding threshold limits, while also being capable of automatically adjusting to changes in fuel properties, such as, for example, changes in the methane number or diluent(s) of/in a natural gas fuel that is utilized at least in the in-cylinder combustion event. Embodiments of the present application can also be configured to prevent or minimize conflicts between adjustments in the operation of an engine associated with engine knock and NOx emissions, and may also be configured to seek to generally maintain a relatively constant spark timing level or value and/or maximize the brake thermal energy (BTE) of the engine with the associated fuel.

FIG. 1 illustrates a schematic block diagram of an exemplary internal combustion engine system 100 that includes a lean burn spark ignition engine 102 that is connected to an intake system 104 and an exhaust system 106. It shall be appreciated that the illustrated configuration and components of the engine system 100 are but one example, and that the disclosure contemplates that a variety of different engine systems and the associated components may be utilized. Further, the engine system 100 may be used in a variety of different applications or platforms, and moreover with a variety of different types of machines, vehicles, and/or devices, including, but not limited to, stationary devices as well as on-road vehicles, including automotive applications. The engine 102 can receive fuel from one or more fuel sources 108. Further, while the illustrated embodiment may generally depict an engine system 100 used with lean burn spark ignition engine applications, the engine system 100 can be structured to operate with a variety of types of fuels that are delivered from the fuel source 108, including, for example, natural gas, bio-gas, methane, propane, gasoline, ethanol, producer gas, field gas, liquefied natural gas, compressed natural gas, landfill gas, gaseous fuel, and/or any combination thereof, among other fuels.

According to the exemplary embodiment, the engine 102 includes an engine block that may define at least a portion of one or more cylinders. For example, according to certain embodiments, the engine 102 can include six or eight cylinders in an in-line arrangement. However, the engine 102 may have any different number of cylinders, as well as cylinders in a variety of different arrangements. Additionally, each cylinder is sized to accommodate the slideable displacement of a piston along at least a portion of the cylinder such that the pistons may reciprocate between a top-dead-center position and a bottom-dead-center position. Each of the cylinders, its respective piston and cylinder head, form a combustion chamber. Further, at least a portion of the forces generated by the slideable displacement of the piston along at least a portion of the cylinder during combustion events in the combustion chamber are transmitted to a mechanical drive system 110. For example, the pistons are typically operably coupled to a crank shaft of a mechanical drive system 110 of the engine system 100 that converts the reciprocal movement of the pistons of the engine 102 into rotational movement.

The cylinders are in selective fluid communication with the intake system 104 such that a charged air flow can be delivered to the combustion chamber. The cylinders are also in selective fluid communication with the exhaust system 106 such that exhaust gases produced by combustion of fuel(s) in the combustion chambers can be delivered through an exhaust manifold 112 of the exhaust system 106. The exhaust system 106 can include and/or be coupled to a variety of different components, such as, for example, one or more turbochargers 114a, 114b, as well as an after-treatment system 116.

Operation of fuel injection events can include the delivery of charge flow and fuel to the combustion chambers of the engine 102. According to certain embodiments, fuel, such as, for example, a natural gas, can be fumigated into the charge flow upstream of the cylinders of the engine 102, such as, for example, upstream or downstream of the compressor 114a, at the intake manifold 142, and/or cylinder ports, or can be fumigated into the charge mixture in-cylinder. The delivery of the charge mixture and/or the fuel into the combustion chambers may be, at least in part, electrically controlled by a control system 126 of the engine system 100.

The control system 126 can include a controller 128 that can be configured to control various operational aspects of engine system 100, including fuel injection events, among other operations. The controller 128 can be implemented in a number of ways. Further, the controller 128 can execute operating logic that defines various control, management, and/or regulation functions. The operating logic may be in the form of one or more microcontroller or microprocessor routines stored in a non-transitory memory, dedicated hardware, such as a hardwired state machine, analog calculating machine, various types of programming instructions, and/or other forms as would occur to those skilled in the art.

The controller 128 may be provided as a single component, or a collection of operatively coupled components, and may comprise digital circuitry, analog circuitry, or a hybrid combination of both of these types. When of a multi-component form, the controller 128 may have one or more components remotely located relative to the others in a distributed arrangement. The controller 128 can include multiple processing units arranged to operate independently, in a pipeline processing arrangement, in a parallel processing arrangement, or the like. In one embodiment, the controller 128 includes several programmable microprocessing units of a solid-state, integrated circuit type that are distributed throughout the engine system 100 that each includes one or more processing units and non-transitory memory. For the depicted embodiment, the controller 128 includes a computer network interface to facilitate communications using standard Controller Area Network (CAN) communications or the like among various system control units. It should be appreciated that the depicted modules or other organizational units of the controller 128 refer to certain operating logic performing indicated operations that may each be implemented in a physically separate controller of the controller 128 and/or may be virtually implemented in the same controller.

The description herein including modules and/or organizational units emphasizes the structural independence of the aspects of the controller 128, and illustrates one grouping of operations and responsibilities of the controller 128. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 128 include sensors of a sensor system 129 providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The controller 128 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Figure 2:
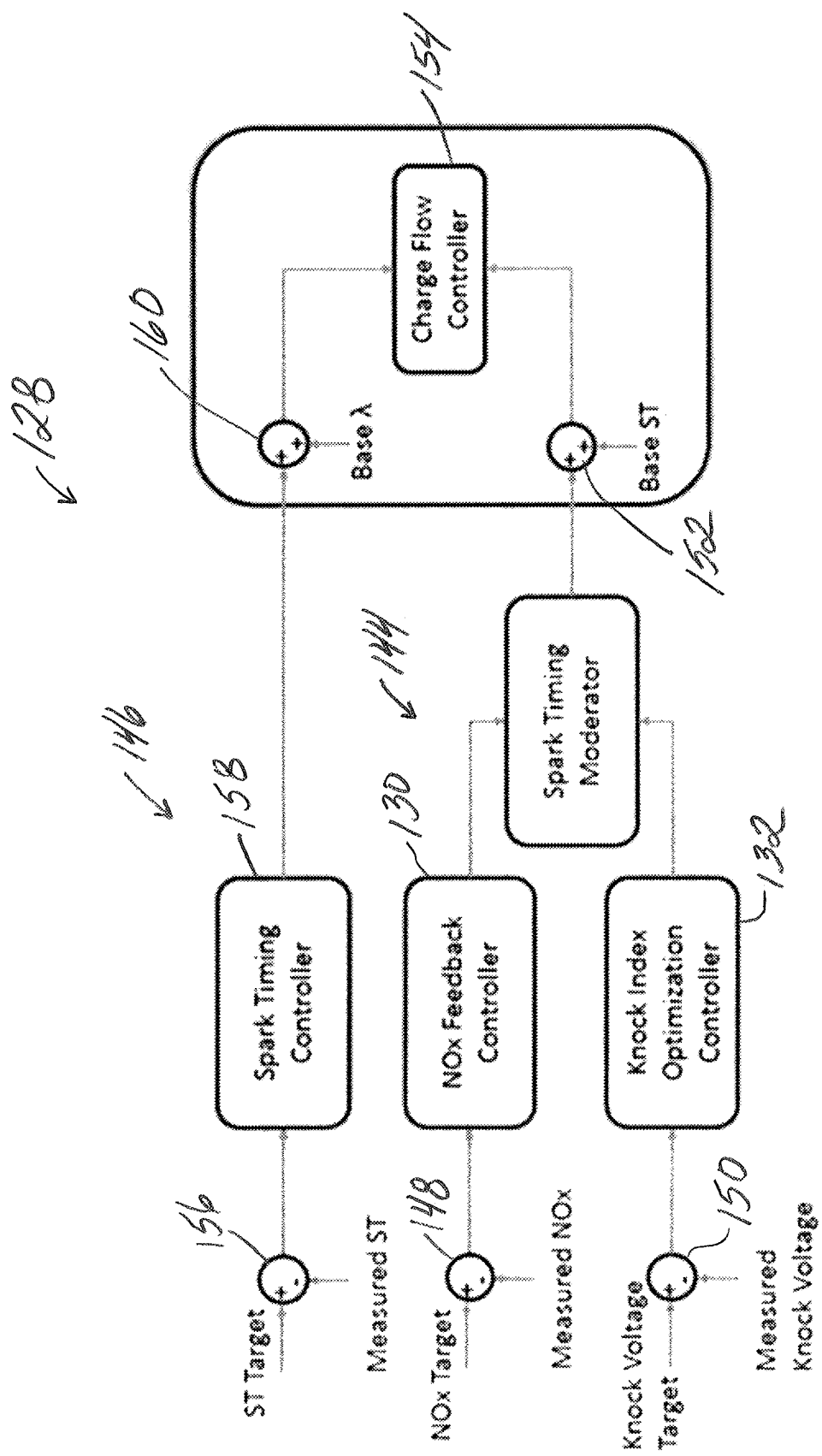
FIG. 2 illustrates a block diagram of certain components of an exemplary controller used to control certain operations of components of an engine system.

Referencing FIG. 2, according to the certain embodiments, the controller 128 can include a spark timing module 144 and an air-to-fuel module 146. According to such an embodiment, the spark timing module 144 can be configured to adjust spark timing to attain an engine knock and/or NOx target level, while the air-to-fuel module 146 can be adapted to modify an air-to-fuel ratio to bring spark timing back to a target level or value. Further, according to certain embodiments, adjustments to spark timing, as determined using the spark timing module 144, can be implemented prior to implementation of adjustments to the air-to-fuel ratio, as determined by the air-to-fuel module 146. While FIG. 2 illustrates the spark timing module 144 and the air-to-fuel module 146, as well as the associated components, as separated components, according to other embodiments at least some of these components may each be part of the same component or part of other components of the controller 128. Further, the controller 128 can, according to other embodiments, include other modules and/or controllers in addition to those illustrated in FIG. 2.

According to the illustrated embodiment, the spark timing module 144 can include a NOx feedback controller 130, a knock index controller 132, and a moderator module 134. The NOx feedback controller 130 can be configured to determine adjustments to spark timing, among other adjustments, that can at least assist the engine 102 in attaining, or being closer to, a target NOx level. According to the illustrated embodiment, the NOx feedback controller 130 can be electrically coupled to a first comparator 148, also referred to as an NOx comparator, that is configured to evaluate a first NOx level (referred to in FIG. 2 as "Measured NOx") with a NOx target value (referred to in FIG. 2 as "NOx Target"). According to certain embodiments, the first NOx level can correspond to an actual, predicted, or estimated NOx level associated with the operation of the engine 102. For example, the first comparator 148 may be operably coupled to one or more NOx sensors 138 that can be positioned at a variety of locations about the engine system 100. For example, according to certain embodiments, the NOx feedback controller 130 can be in electrical communication with a NOx sensor 138 that is positioned to detect NOx in an exhaust gas that has been released from the engine 102 and/or cylinders, including one or more NOx sensors that may be positioned upstream, at, and/or downstream of an exhaust manifold 112, turbine 114b, and/or exhaust after treatment system 116, among other locations. Additionally, or alternatively, the first NOx level can be a NOx level that is predicted or estimated based on other measured or predicted operating conditions or parameters, including, for example, exhaust gas temperature, and in-cylinder pressure, among other conditions or parameters. Further, for example, according to certain embodiments, the first NOx level can be a model NOx level that is based, at least in part, on information provided by one or more sensors, measurements, and/or models in addition to, or, alternatively in lieu of, an actual NOx value(s). For example, according to certain embodiments, determination of NOx levels can be attained through the use of a Torque over Boost (TOB) approach, thereby providing a virtual NOx sensor that can replace a NOx sensor 138 and/or be used as a backup in the event that the NOx sensor(s) 138 fails. According to certain embodiments, the target NOx level or range can be a pre-determined threshold NOx level(s) or range(s). Further, according to certain embodiments, the target NOx level(s) or range(s) can be adjusted based on certain factors, including, for example, engine load and/or engine speed, among other variables.

The first comparator 148 can provide an indication to the NOx feedback controller 130 of the difference(s), if any, between the first NOx level and the target NOx level. The NOx feedback controller 130 can be structured to determine, based at least in part on the information from the first comparator 148 regarding differences in the first and target NOx levels, adjustments to spark timing that can bring the level of NOx being generated by operation of the engine 102 generally closer to, within, and/or below, the target NOx level. Such adjustments can include, but are not limited to, adjusting spark timing, including, for example, retarding or advancing spark timing, so as to either reduce or increase the level of NOx being generated by operation of the engine 102.

The knock index controller 132 can be adapted to determine adjustments to spark timing, among other adjustments, that can at least assist the engine system 100 with being generally closer to, within, and/or below an engine knock threshold limit(s) or range(s). According to the illustrated embodiment, the knock index controller 132 can be electrically coupled to a second comparator 150, also referred to as a knock level comparator, that is configured to evaluate a first engine knock level (referred to in FIG. 2 as a measured knock voltage) with an engine knock target value (referred to in FIG. 2 as knock voltage target). Further, according to certain embodiments, the first engine knock level can correspond to an actual, predicted, or estimated engine knock level associated with the operation of the engine 102. For example, the second comparator 150 can be operably coupled to one or more knock sensors, knock vibration sensors, temperature sensors, and/or in-cylinder pressure sensors, among other sensors. Moreover, according to certain embodiments, the second comparator 150 may be part of, or in communication with, a knock control system that may, with the use of a knock and/or vibration sensor 133, detect and analyze vibrations and/or noises in the engine system 100 associated with the operation of one or more components of the engine system 100. The second comparator 150 and/or controller 128, among other components, may further be adapted to track or maintain one or more records pertaining to the detected, determined, and/or predicted occurrences of engine knock during the course of one or more time periods. Thus, according to certain embodiments, the second comparator 150 may be in electrical communication with a timer 131 of the controller 128 that can indicate the timing of an actual and/or predicted engine knock, a period of time between one or more actual and/or predicted engine knocks, and/or the number of predicted and/or actual engine knocks over the course of a time period(s). Accordingly, the second comparator 150 and/or another component of the controller 128 can be adapted to determine whether one or more characteristics of a detected and/or predicted engine knock, or plurality of engine knocks, does or does not meet or exceed a threshold knock limit. For example, the second comparator 150 may determine whether the number of detected and/or predicted engine knocks in a given time period does or does not exceed a knock margin or other knock threshold value and/or is or is not close to a threshold engine knock value. According to certain embodiments, the target engine knock level can be a pre-determined threshold engine knock level(s) or range(s). Further, according to certain embodiments, the target engine knock level(s) or range(s) can be adjust based on certain factors, including, for example, engine load and/or engine speed, among other variables.

The second comparator 150 can provide an indication to the knock index controller 132 of the difference(s), if any, between the first engine knock level and the target engine knock level. The knock index controller 132 can be structured to determine, based at least in part on the information from the second comparator 150 regarding differences in the first and target engine knock levels, adjustments to spark timing that can bring the level of engine knocks being generated by operation of the engine 102 to a level that is generally closer, within, and/or below, the target engine knock level(s) or range(s). Such adjustments can include, but are not limited to, adjusting spark timing, including, for example, advancing or retarding spark timing. For example, similar to the NOx feedback controller 130, in at least certain situations, the knock index controller 132 can determine an adjustment in the spark timing event that can bring engine knock levels closer to a threshold engine knock limit, and which involves the retarding or advancing of the spark timing so as to either reduce or increase the level of knock being generated by operation of the engine 102.

According to the certain embodiments, the moderator module 134 can be adapted to evaluate at least certain aspects of the instructions or information provided by the NOx feedback controller 130 and the knock index controller 132. Moreover, the moderator module 134 can be adapted to resolve potential conflicts that may be presented by, or created by, the instructions or information provided by the NOx feedback controller 130 and the knock index controller 132 in connection with their its attempts to adjust engine operations to adjust NOx levels and engine knock levels, respectively. According to the illustrated embodiment, the moderator module 134 may be adapted to evaluate at least certain aspects of the instructions or information provided by the NOx feedback controller 130 and the knock index controller 132, and based on that evaluation, select the information or instructions from one, and only one, of the NOx feedback controller 130 and the knock index controller 132 for implementation by the controller 128, engine 102, and/or engine system 100. Additionally, according to certain embodiments, the one or more characteristics evaluated by the moderator module 134 may be based on which instructions or information from the NOx feedback controller 130 and the knock index controller 132 the moderator module 134 determines can facilitate the largest retardation of combustion events. Moreover, according to certain embodiments, selection of the instructions or information from the one of the NOx feedback controller 130 and the knock index controller 132 that can result in the largest retardation of the combustion event can be selected. Such an approach can, in at least certain situations, be viewed as having a greater likelihood attaining both NOx levels and engine knock levels that are within and/or below associated threshold levels. Further, in at least certain situations, as NOx and engine knock levels may rise and fall together, albeit at different slopes, such an approach of adjusting spark timing based on the instructions or information from one of the NOx feedback controller 130 and the knock index controller 132 may allow one of the NOx level and engine knock level to be around, or relatively close to, the corresponding threshold level, while the other of the NOx and engine knock levels can below the associated threshold level. Additionally, upon selection and implementation of the selected information and/or instructions, according to certain embodiments, the moderator module 134 may, or may not, be configured to control subsequent attempts by the NOx feedback controller 130 and/or the knock index controller 132 to further adjust spark timing.

According to the illustrated embodiment, information or instructions communicated from the mediator module 134 can be communicated to a third, adjusted spark timing comparator 152. According to the illustrated embodiment, the third, adjusted spark timing comparator 152 can compare the adjustment spark timing associated with the information or instructions selected by the moderator module 134, with a base spark timing value (shown in FIG. 2 as "Base ST"). For example, according to certain embodiments, the base spark timing value can be a standard angular position of a piston in a cylinder when a spark event is to occur, while the adjustment selected by the moderator module 134 is a different or adjusted angular position of the piston in the cylinder when the spark event is to occur. According to such an embodiment, the differences, if any, in the adjusted spark timing associated with the information or instructions selected by the moderator module 134 and the base spark timing can be communicated to a charge flow controller 154.

The charge flow controller 154 can, at least in part, be adapted to provide instructions to adjust the operation of certain components of the engine 102 and/or engine system 100 so as to adjust the air-to-fuel mixture and/or spark timing. For example, according to certain embodiments, in response to instructions or information from the spark timing module 144 and/or the third comparator 152, the charge flow controller 154 can communicate instructions to adjust when a spark plug(s) in one or more cylinders is to provide a spark and/or the timing at which power is provided to the spark plug(s) to initiate a spark event. Thus, with respect to at least the operation of the spark timing module 144, the charge flow controller 154 can adjust when the operation of certain components associated with providing a spark in the cylinder so as to advance or retard spark timing in accordance with instructions or information from the spark timing module 144, and thereby bring one or both of the NOx level(s) and engine knock level(s) to, around, or below associated target threshold levels.

Figure 3:
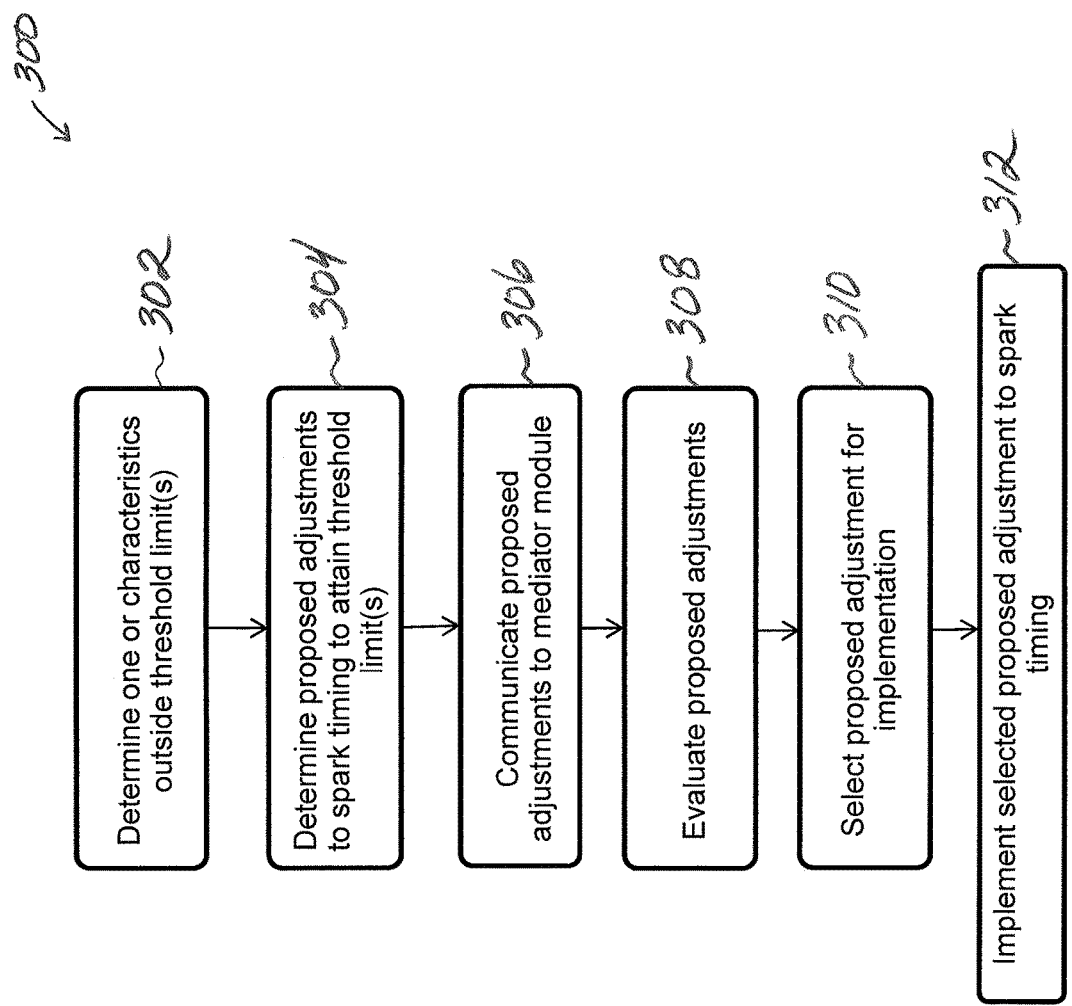
FIG. 3 illustrates a flow diagram of an exemplary process of operation of a spark timing module for adjusting spark timing so as to maintain at least one of an engine knock level and a threshold NOx level within a threshold level.

FIG. 3 provides a flow diagram of an exemplary process 300 of operation of a spark timing module 144 in the selection of proposed instructions or information from the NOx feedback controller 130 and the knock index controller 132 for implementation in adjusting one or more operations and/or characteristics of the engine system 100, including, for example, adjusting spark timing. The operations illustrated for all of the processes in the present application are understood to be examples only, and operations may be combined or divided, and added or removed, as well as re-ordered in whole or in part, unless explicitly stated to the contrary.

At step 302, the engine system 100 can determine or detect that one or more characteristics relating to the operation of the engine system 100 does, or is predicted to, not satisfy a particular value(s) or range of values, including, for example, not being below a certain threshold value(s) or range of values. For example, referencing FIG. 2, such a determination can be the first comparator 148 determining the first NOx level is outside or away from the threshold for a target NOx level(s) or range(s) and/or by the second comparator 150 determining that the first engine knock level is outside or away from a threshold for a target engine knock level(s) or range(s). At step 304, information indicating differences between the NOx and/or engine knock level(s) or range(s) and associated threshold level(s) or range(s) can be utilized by the associated NOx feedback controller 130 and the knock index controller 132 to determine an adjustment(s) in spark timing that could at least assist in the bringing the corresponding NOx and/or engine knock levels to closer to and/or within threshold levels. For example, the NOx feedback controller 130 can provide instructions that seek to advance or retard spark timing as to either increase or reduce the level of NOx being generated by operation of the engine 102

At step 306, the proposed instructions or information from one or both of the NOx feedback controller 130 and the knock index controller 132 can be communicated to the moderator module 134. The moderator module 134 can be configured to, at step 308, evaluate the impact the proposed instructions or information from one or more of the NOx feedback controller 130 and the knock index controller 132 can have on certain aspects of operation of the engine system 100. For example, according to certain embodiments, the moderator module 134 can be adapted to evaluate proposed instructions from the knock index controller 132 relating to adjusting spark timing, and the effects such adjustments, if implemented, could have on NOx levels and/or engine knock levels. As previously mentioned, according to certain embodiments, such evaluation by the moderator module 134 can involve the moderator module 134 determining which instructions or information from the NOx feedback controller 130 and the knock index controller 132, if implemented, would result in adjustments that facilitate the largest retardation of the combustion event.

At step 310, the moderator module 134 can select which instruction or information is to be implemented to adjust certain operations of the engine 102 and/or engine system 100. For example, in the illustrated embodiment, the moderator module 134 can select at step 310 the adjustment that is to be made to spark timing. Again, according to certain embodiments, such selection can involve selecting the instructions or information from one, but not both, of the NOx feedback controller 130 and the knock index controller 132. Accordingly, at step 312, the selected information or instructions may be implemented, such as, for example, via instructions provided by the charge flow controller 154. For example, according to certain embodiments, the selected information or instructions can provide an indication to the charge flow controller 154 of the degree spark timing is to be either advanced or retarded, which can then be implemented using instructions communicated by the charge flow controller 154 for adjustments in the operation of certain components of the engine 102 and/or engine system 100.

Referencing FIG. 2, according to certain embodiments, the air-to-fuel module 146 includes a fourth, spark timing comparator 156 and a spark timing controller 158. The fourth comparator 156 can evaluate a measured or predicted spark timing (identified as "Measured ST" in FIG. 2) and a target spark timing (identified as "Target ST" in FIG. 2). According to certain embodiments, the "Measured ST" can correspond to the adjusted spark timing selected by the moderator module 134, as discussed above, for example, at least in connection with steps 310 and 312 of the process 300 depicted in FIG. 3. Thus, according to certain embodiments, implementation of changes or adjustments in the operation of the engine 102 and/or engine system 100 can occur after adjustments to spark timing have been implemented via use of the spark timing module 144. Alternatively, according to other embodiments, the "Measured ST" can be a spark timing value taken before an adjustment of the spark timing associated with operation of the NOx feedback controller 130. Further, according to certain embodiments, the "Measured ST" and the "Target ST" can correspond to the angular position of a piston within a cylinder at the time of the spark event.

The spark timing controller 158 of the air-to-fuel module 146 is configured to determine, based on information provided by the fourth comparator 156, changes in an air-to-fuel ratio that can bring the spark timing back to, or around, the target spark timing level. Moreover, in response to at least changes to spark timing that may have occurred in at least an attempt(s) by the spark timing module 144 to bring engine knock and/or NOx levels closer to and/or below threshold target levels, the spark timing controller 158 can be adapted to use subsequent adjustments in air-to-fuel ratios to at least attempt to retain the adjusted engine knock and/or NOx levels at, around, and/or below, threshold target levels while regaining, or being closer to, target spark timing values. Thus, according to certain embodiments, the spark timing controller 158 can be adapted to determine an adjustment to the air-to-fuel (lambda) value based on differences between the target spark timing value and the measured or predicted spark timing value, as provided by the fourth comparator, so as to maintain NOx and/or engine knock levels are maintained at, around, or below target threshold values when spark timing is returned to, or around, a target spark timing value(s).

For example, in certain instances in which the spark timing had been retarded, the spark timing controller 158 can determine the extent the air-to-fuel ratio is to be leaned, and/or an associated leaner air-to-fuel ratio that can be utilized if and when the spark timing is returned to, or around, the target spark timing value. Similarly, in certain instances in which the spark timing had been advanced, the spark timing controller 158 may determine the extent the air-to-fuel ratio is to be richer, and/or an associated richer air-to-fuel ratio, that can be utilized if and when the spark timing is returned to, or around, the target spark timing value. Such changes in air-to-fuel ratio can generally be derived in a manner that can allow spark timing to be maintained at, or brought back to, a relatively constant target spark timing value while engine knock levels and/or NOx levels are at, around, and/or below associated threshold target limits.

According to the illustrated embodiment, the adjusted air-to-fuel ratio (lambda) that is determined by the spark timing controller 158 can be provided to a fifth, lambda comparator 160. The fifth comparator 160 can be configured to evaluate the adjusted air-to-fuel ratio in relation to a base air-to-fuel ratio (lambda). A variety of different values can be used as the base air-to-fuel ratio (lambda). For example, the base air-to-fuel ratio (lambda) can be a target air-to-fuel ratio or range of values. Further, the base air-to-fuel ratio can be adjustable based on a variety of factors, including, for example, engine load, engine speed, air density, air temperature, and/or fuel properties, among other criteria. Further, according to certain embodiments, the base air-to-fuel ratio can be provided by one or more models, and can be associated with an ideal air-to-fuel ratio. Further, the evaluation of the base air-to-fuel ratio and the adjusted air-to-fuel ratio, as provided by the spark timing controller 158, can derive differences, if any, between those lambda values or other associated values. As depicted by FIG. 2, according to certain embodiments, the results, or information pertaining to, the evaluation by the fifth comparator 160 can be provided to the charge flow controller 154.

In addition to at least assisting in implementing adjustments selected by the moderator module 134, as previously discussed, the charge flow controller 154 can also be adapted, at least in part, to at least assist in the implementation of adjustments based on information derived or provided by the air-to-fuel module 146, including information that is evaluated by the fifth comparator 160. For example, the charge flow controller 154 can receive information from the air-to-fuel module 146 via the fifth comparator 160 relating to adjustments to the air-to-fuel ratio (lambda) and, based on that information or instructions, provide commands that are used to alter or adjust the operation of certain components of the engine 102 and/or engine system 100 to effectuate such adjustments. For example, according to certain embodiments, the charge flow controller 154 can, based at least in-part on information or instructions from the air-to-fuel module 146, issue commands that adjust the amount of fuel that is fumigated into the charge flow and/or the amount of fuel that is delivered into the combustion chamber by a fuel injector or other fuel delivery component, and thereby adjust the air-to-fuel ratio to be richer or leaner. Further, as previously discussed, the charge flow controller 154 can also provide instructions that can alter the spark timing, which can include bring or maintaining the spark timing at or around a target spark timing value. For example, information received from the air-to-fuel module 146 can include instructions relating to retaining the target spark timing value, including, for example, the degree to which the spark timing is to be adjusted to return to, or be around, the target spark timing value. Alternatively, according to certain embodiments, the charge flow controller 154 can be structured to adjust the spark timing to, or around, a target spark timing value(s) in connection with receipt of instructions relating to the air-to-fuel module 146 determination of adjustments to the air-to-fuel ratio.

Figure 4:
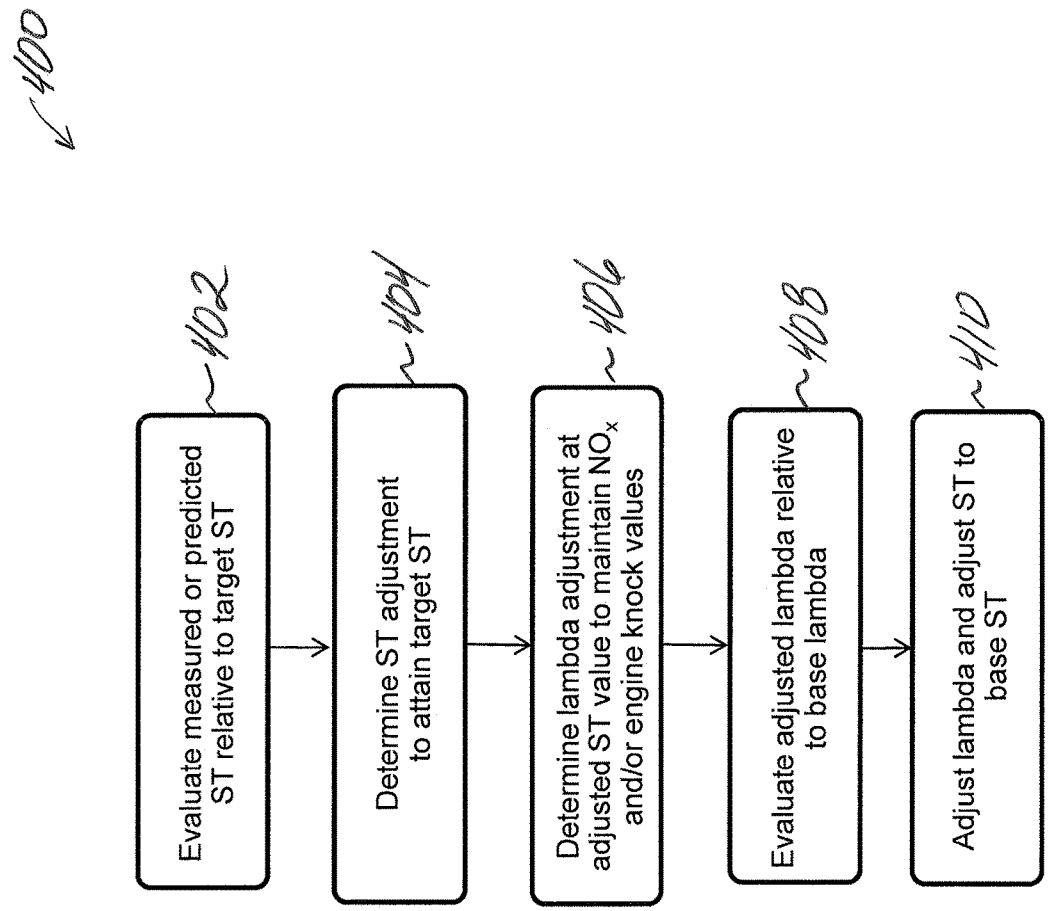
FIG. 4 illustrates a flow diagram of an exemplary process of operation of an air-to-fuel module in the adjustment of a spark timing event and the associated adjustment of an air-to-fuel ratio so as to maintain one or both of a NOx level and an engine knock level at, around, and/or below a corresponding threshold value.

FIG. 4 illustrates a flow diagram of an exemplary process 400 of operation of an air-to-fuel module 146 in the adjustment of spark timing to a target value and the associated adjustment of the air-to-fuel ratio so as to maintain one or both of an NOx level and an engine knock level at, around, and/or below a corresponding threshold value. At step 402, an evaluated or measured or predicted spark timing ("ST") can be evaluated relative to a target spark timing. For example, referencing FIG. 2, according to certain embodiments, such evaluation can involve the fourth, spark timing comparator 156 determining differences, such as, but not limited to, a measured or predicted and a target angular position of a piston within a cylinder at the time of the spark event. Further, as previously discussed, according to certain embodiments, and/or in at least certain situations, the measured or predicted spark timing can the adjusted spark timing selected by the moderator module 134, as discussed, for example, with respect to at least steps 310 and 312 of the process 300 depicted in FIG. 3.

At step 404, based at least in part on the results of the evaluation at step 402, a determination can be made as to what changes or adjustments to the spark timing will bring the spark timing back to, or around, the target spark timing value. For example, according to certain embodiments, a determination at step 402 can be that the measured or predicted angular position of a piston within a cylinder at the time of the spark event spark timing is a certain number of degrees less or greater than the target angular position of the piston at the time of the spark event. According to such a situation, the results of the determination at step 402 can be used at step 404 to determine the extent the spark timing value is to be adjusted to attain or maintain the target spark timing. In connection with the determined adjustment of the spark timing value, at step 406 a determination can be made as to an adjustment(s) in the air-to-fuel ratio (lambda) that can at least assist in retaining NOx and/or engine knock levels at or below associated threshold target values in view of adjustments, as determined at step 404, that can bring the sparking timing value back to, or around, the target spark timing value. For example, as previously mentioned, such adjustments at step 404 can involve determining the extent the air-to-fuel ratio is to be leaned, and/or an associated leaner air-to-fuel ratio, if the spark timing value is being returned to the target spark timing value from a retarded spark timing value. Similarly, such a determination at step 406 can involve determining the extent the air-to-fuel ratio is to be richer, and/or an associated richer air-to-fuel ratio, if the spark timing value is returning to the target spark timing value from an advanced spark timing value.

At step 408, according to certain embodiments, the adjusted air-to-fuel ratio can be compared to a base air-to-fuel ratio. According to certain embodiments, the base air-to-fuel ratio can vary based on a number of factors, including, for example, current operating demands and/or conditions of the engine 102 and/or engine system 100, as well as ambient conditions, among other factors. According to certain embodiments, such a comparison can indicate the degree or amount, if any, that the air-to-fuel ratio being used in the operation of the engine 102 is to be adjusted. At step 410, the results of the evaluation, such as, for example, the results of the comparison between the base air-to-fuel ratio and the adjusted air-to-fuel ratio, can be provided for implementation. For example, according to the embodiment of a controller 128 discussed above with respect to FIG. 2, implementation of such an adjustment, if any, can be communicated via commands from the charge flow controller 154 and implemented by various components of the engine system 100 and/or engine 102 that can adjust the charge flow and/or the delivery or injection of fuel that is used for the combustion event.

Figure 5:
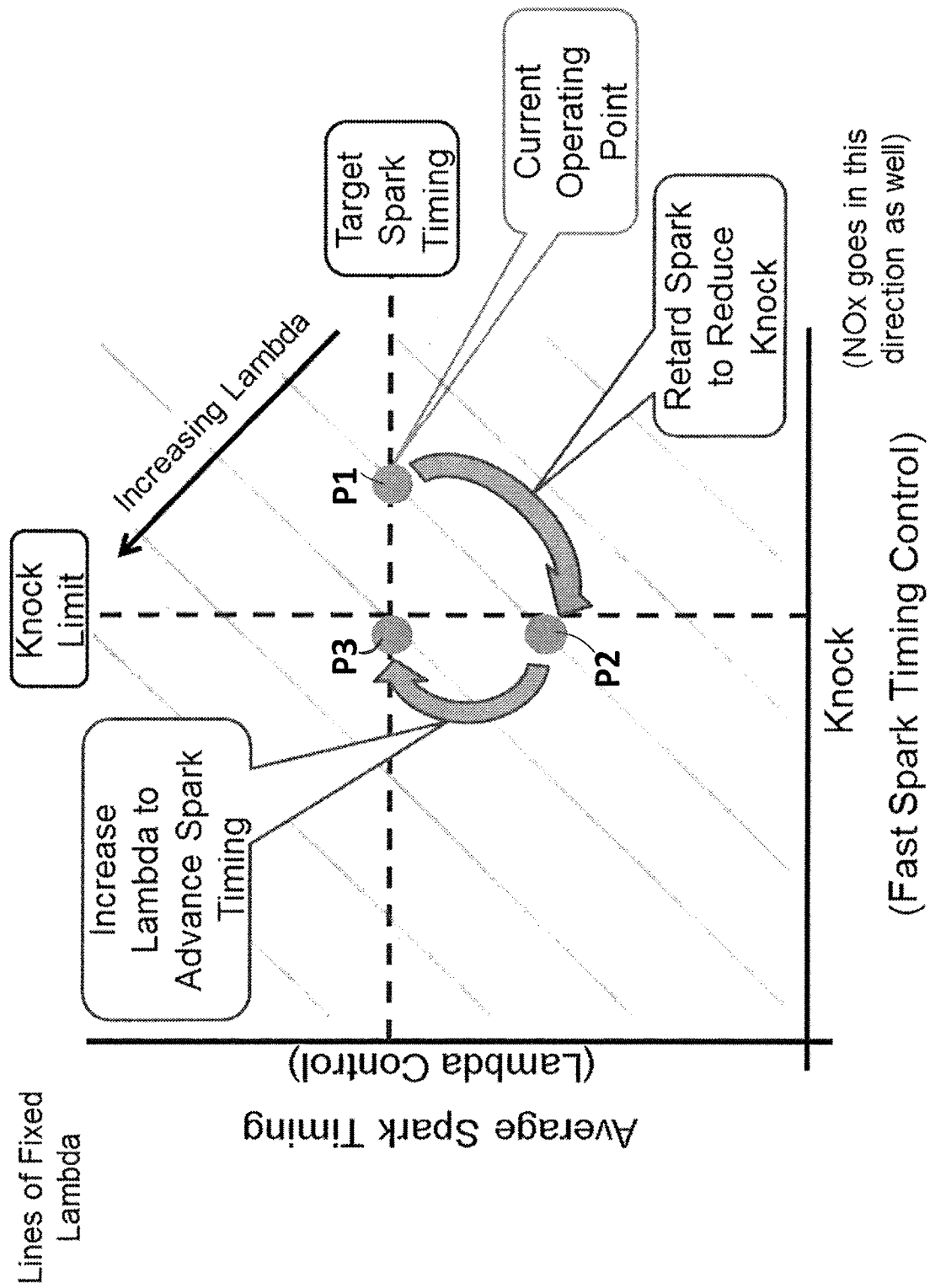
FIG. 5 illustrates an exemplary graphical representation of certain control strategies of an embodiment of the present application that utilize engine knock limits and NOx limits in connection with controlling an air-to-fuel ratio and spark timing for combustion events in one or more cylinders of an engine.

FIG. 5 illustrates an exemplary graphical representation of certain control strategies of an embodiment of the present application that initially controls spark timing to control certain levels, and subsequently adjusts an air-to-fuel ratio to continue to control those levels while bringing spark timing back to a target value. In the illustrated graph, the dashed horizontal line extending through the middle of the graph indicates knock level, with an intersecting dashed line that also extends through the middle of the graph indicating a knock limit threshold. Additionally, the horizontal axis provides an indication of the effect of fast spark timing control on engine knock, with the intersecting vertical axis providing an indication of average spark timing.

As shown by the example depicted in FIG. 5, a current operating point P1 is at a level in which the average spark timing is generally at or around a target spark timing value, but the engine knock level exceeds the threshold "knock limit". Accordingly, in such a situation, as discussed above, the spark timing module 144, including, for example, the NOx feedback controller 145, can provide instructions or information to the moderator module 134 regarding adjustments to the spark timing value that can bring the engine knock level to, or around, the threshold engine knock level. Additionally, although FIG. 5 does not depict NOx levels, in at least certain situations, the knock index controller 132 can also provide instructions to moderator module 134 that can bring the NOx levels to, or around, the threshold target NOx level. As previously discussed, in such a situation, the moderator module 134 can evaluate, and select one of, the instructions provided by the NOx feedback controller 145 and the knock index controller 132. Further, as also previously discussed, according to certain embodiments, such selection can be based on which of the instructions provide the largest retardation of the combustion event, which can at least assist in facilitating at least one of the NOx and engine knock levels being at or around the associated threshold target value and the other of the NOx and engine knock levels being at, around, or below the associated threshold target value. In the example depicted in FIG. 5, the moderator module 134 may have selected the information or instructions of the knock index controller 132, which, when implemented, retards the spark timing in a manner that results in the engine knock levels (indicated by operating point P2) being around, or relatively slightly below, the threshold target engine knock level.

Additionally, according to the illustrated example shown in FIG. 5, the control strategy can also include attempts to bring the spark timing level or value back to, or around, the target spark timing level or value while maintaining the engine knock level at or around the target knock limit. According to the illustrated embodiment, the increase in spark timing can be associated with an increase in the air-to-fuel ratio (lambda). Thus, with such modifications, as shown by operating point P3 in FIG. 5, such adjustments can result in the spark timing returning to the target spark timing value while the engine knock level remains around, or slightly below, the target or threshold knock limit.

While, for at least purposes of illustration, FIG. 5 and the associated discussion are directed to instances involving adjustments that are at least initially based on engine knock levels, such discussion would apply in a similar manner for controlling NOx levels. For example, such an example could involve replacing the horizontal dashed line depicted in FIG. 5 that provides an indication relating to engine knock with a similar line that provides an indication of NOx levels. Further, such an example could also involve retarding spark timing to bring the NOx levels around or below the threshold or target NOx level, and subsequently adjusting the air-to-fuel ratio, such as, for example, leaning the air-to-fuel ratio, accordingly to compensate for subsequent changes in spark timing that bring the spark timing level back to, around the target spark timing value while still maintaining the adjusted NOx levels around or below the corresponding threshold or target NOx level.

Figure 6:
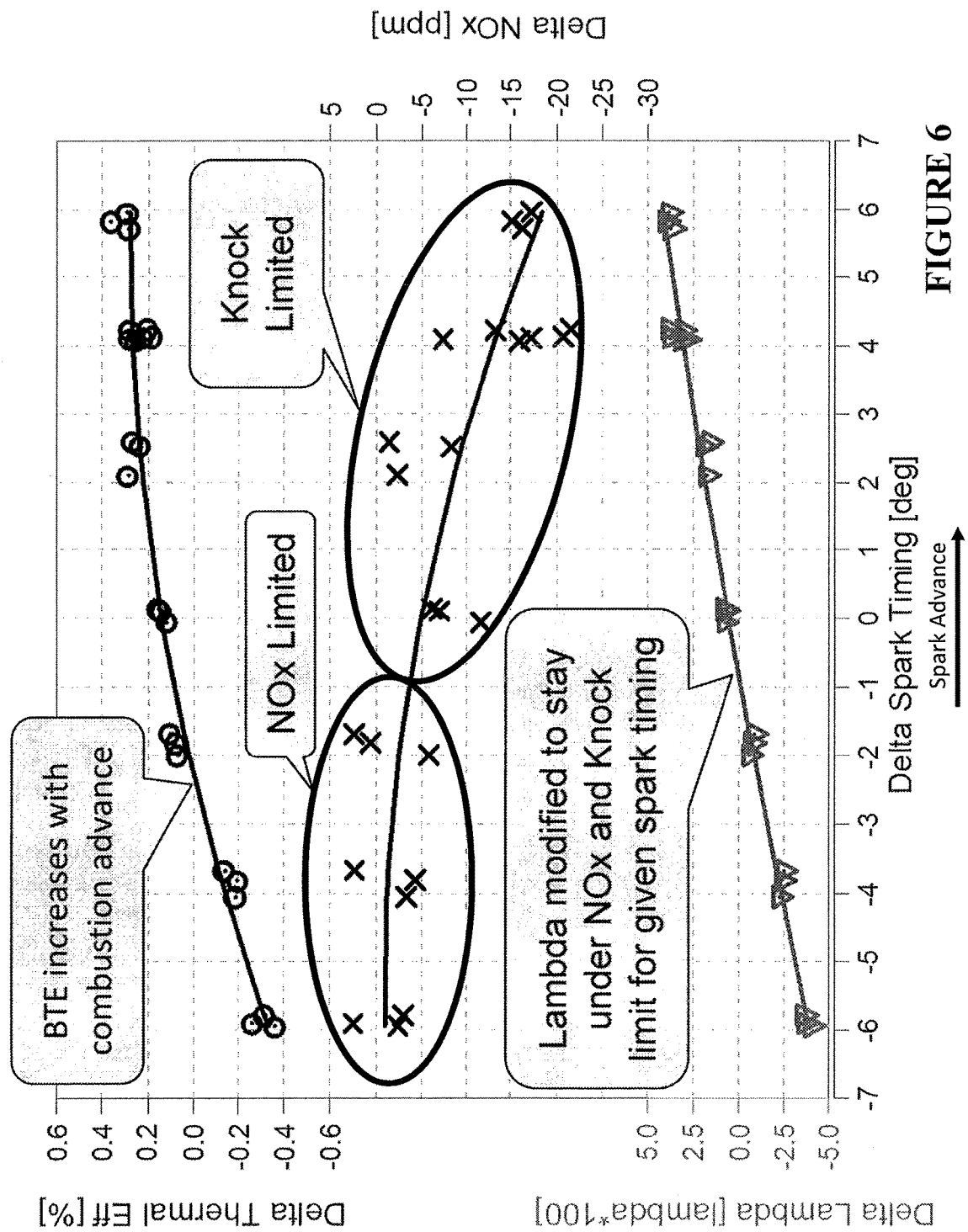
FIG. 6 illustrates an exemplary graphical representation of certain control strategies of an embodiment of the present application used to control NOx and engine knock levels.

Referencing FIG. 6, generally, combustion advance can be a relatively major factor in attaining higher brake thermal energy (BTE). Additionally, in at least certain situations, higher brake thermal energy (BTE) can be attained at relatively lower NOx levels. Thus, according to certain embodiments, the controller 128 can be configured to control the engine system 100 in a manner that attains relatively lean air-to-fuel ratios (lambda), such as, for example, NOx levels that allow further combustion advance up to an engine knock limit. Moreover, the controller 128 can be adapted to operate the engine system 100 to lean out the air-to-fuel ratio to levels that can further combustion advance up to an engine knock limit, as indicated, for example, by at least operating point P3 in FIG. 5.

FIG. 6 includes a graphical representation of changes in NOx levels for two situations, one in which the NOx level was limited ("NOx Limited"), such as, for example, limited up to a certain value (as measured by parts per million (NOx ppm)), and the other in which the engine knock level was limited ("Knock Limited"). FIG. 6 also includes a depiction of brake thermal energy (BTE) associated with both situations, and more specifically, for the situations in which the depicted NOx levels were limited and situations in which engine knock levels were limited. As shown in FIG. 6, for the NOx limited situation, and then the engine knock limited situation, the average spark timing was stepped up, such as, for example, being changed from an average spark timing that was retarded from a base spark timing value (as indicated by 0 degrees) by six degrees to an average spark timing value that was advanced by six degrees. Accordingly, in connection with stepping up such increases in the average spark timing value, the air-to-fuel ratio (lambda) was also adjusted in a manner that at least attempted to maintain the limited NOx level and/or the limited engine knock level.

As demonstrated by the data in FIG. 6, an increase in average spark timing can be associated with an increase in brake thermal energy (BTE). Moreover, as shown in FIG. 6, according to the illustrated example, a change in average spark timing from negative six degrees to positive six degrees relative to a base spark timing is shown as being associated with an approximately 0.8% increase in the change in the brake thermal energy. Further, as shown, the maximum BTE was attained that at the maximum advanced spark timing and when the engine knock level was limited, rather than when the NOx level was limited.

Accordingly, as derived from the information provided by FIG. 6, maximizing combustion advances can maximize BTE. Further, such combustion advance can be maximized by either limiting NOx or engine knock levels. Thus, according to certain embodiments, the controller 128 can be structured to drive the combustion event to either the NOx level limit, or to the engine knock limit. Further, in at least certain instances, the controller 128 can be configured to drive further advance at the engine knock limit, which can lead to enhanced BTE levels with lower than target NOx levels.

Additionally, a control strategy that employs average spark timing adjustments can also be adapted to address other changes in the engine system 100, such as, for example, changes relating to loss of throttle margin, including, for example, loss of throttle margin at relatively low methane margins. Additionally, the controller 128, including, for example, the spark timing module 144 and/or the air-to-fuel module 146, can also be configured to adjust to other operating conditions. For example, according to certain situations, increases in intake manifold temperature (IMT) can result in increases in flame speeds that can increase engine knock and NOx levels. Thus, according to certain embodiments, the controller 128 can be electrically coupled to a temperature sensor 140 or other sensor that can indicate the temperature of the intake manifold 142 (FIG. 1) of the engine 102. According to such an embodiment, in response to information indicating an increase in the IMT, such as, for example, the IMT exceeding a threshold value(s) or range(s), the controller 128 can be configured to automatically lean out the air-to-fuel ratio.

Additionally, in at least certain situations, decreases in the humidity of the intake gas, such as, for example, decreases in the humidity level of charged air delivered from the turbine 114a to the intake manifold 142 and/or engine 102, among other intake gases, can result in increases in flame speeds that can increase engine knock and NOx levels. Thus, according to certain embodiments, the engine system 100 can include a sensor that can provide an indication of, or information used to determine, a humidity level(s) of the intake gas. According to such an embodiment, the controller 128 can be configured to determine, for example, if the humidity level of the intake gas or charge flow exceeds a threshold value(s) or range(s). If the controller 128 determines that the intake gas or charge flow exceeds the threshold value(s) or range(s), the controller 128, such as, for example, the air-to-fuel module 146, can adjust the operation of the fuel injection system 136 so as to lean out the air-to-fuel ratio provided in the cylinder of the engine 102.

Similarly, the controller 128, including, for example, the NOx feedback controller 130, can be configured to adjust to detected changes in the BTU characteristics of the fuel. For example, in addition to adapting to changes in the methane number (MN) of the fuel, the controller 128 may be structured to adjust to changes detected in BTU in the fuel delivered to the cylinders of the engine 102. Such changes in the BTU of the fuel may be determined in a number of manners, including, for example, via analysis of the combustion event(s) in the cylinder(s) by the controller 128. Further, such changes can relate to, but is not limited to, the addition of diluents, including changes relating to the addition of, or adjustments in the quantity of, carbon dioxide ($CO_2$) in the fuel, among other diluents. According to certain embodiments, such adjustments in response to changes in the BTU characteristics can include further adjustments in spark timing and/or the air-to-fuel ratio, as previously discussed.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A system comprising:
   an electronic controller configured to:
   determine an adjusted condition level based on a first condition level and a target condition level;
   determine, based at least in part on the adjusted condition level, a first adjusted spark timing value, the first adjusted spark timing value configured to adjust a spark timing event in one or more cylinders of an engine to attain a second condition level, the second condition level being around or within the target condition level;
   determine a second adjusted spark timing value based on a target spark timing value and the first adjusted spark timing value after implementing the first adjusted spark timing value; and
   determine, based at least in part on the second adjusted spark timing value, an adjusted air-to-fuel ratio used to maintain approximately the second condition level when the sparking timing event is operated at approximately the target spark timing value.

2. The system of claim 1, wherein the first condition level is an $NO_x$ level, the target condition level is a threshold $NO_x$ level, and the adjusted condition level is a difference between the first condition level and the target condition level.

3. The system of claim 1, wherein the first condition level is an engine knock level, the target condition level is a threshold engine knock level, and the adjusted condition level is a difference between the first condition level and the second condition level.

4. The system of claim 1, wherein the controller includes a first comparator configured to compare the target condition level and the first condition level, and wherein the first condition level is at least one of a $NO_x$ level and an engine knock level, and wherein the target condition level is at least one of a target $NO_x$ level and a target engine knock level.

5. The system of claim 1, wherein the controller is configured to increase the target spark timing value by an advanced spark timing value to enhance a brake thermal energy level.

6. The system of claim 1, wherein the controller is further adapted to communicate instructions to adjust components of an engine system to adjust the spark timing event and adjust the air-to-fuel ratio.

7. A system comprising:
a controller configured to:
determine a first adjustment for a spark timing event for a combustion event in one or more cylinders of an engine, the first adjustment configured to adjust a first condition to a first adjusted condition;
determine a second adjustment for the spark timing event, the second adjustment configured to adjust a second condition to a second adjusted condition, the second condition being a different type of condition than the first condition;
select one of the first and second adjustments for implementation to adjust the spark timing event;
determine a third adjustment to the spark timing event, the third adjustment configured to, after adjustment of the spark timing event using one of the first and second adjustments, adjust the spark timing event to a target spark timing event; and
determine, based at least in part on the third adjustment and at least one of the first and second adjusted conditions, an adjusted air-to-fuel ratio to maintain one of the first and second adjusted conditions.

8. The system of claim 7, wherein the controller is further configured to select one of the first and second adjustments based on which of the first and second adjustments facilitates the largest retardation of the combustion event.

9. The system of claim 8, wherein the first condition is an $NO_x$ level and the first adjustment condition is an adjusted $NO_x$ level that is around or less than a threshold $NO_x$ level.

10. The system of claim 9, wherein the second condition is an engine knock level and the second adjustment condition is an adjusted engine knock level that is around or less than a threshold engine knock level.

11. The system of claim 10, wherein the first adjustment is a difference between the first condition and the first adjusted condition.

12. The system of claim 11, wherein the second adjustment is a difference between the second condition and the second adjusted condition.

13. The system of claim 12, wherein the controller determines the adjusted air-to-fuel ratio based, at least in part, on maintaining (1) the first condition at a level no greater than the first target condition, and (2) maintaining the second condition at a level that is no greater than the second target condition.

14. The system of claim 13, wherein the third adjustment is a difference between a measured or predicted spark timing event and the target spark timing event.

15. The system of claim 13, wherein the third adjustment is a difference between the selected one of the first and second adjustments and the target spark timing event.

16. A method comprising:
determining a first adjustment to a spark timing value to satisfy a threshold $NO_x$ level;
determining a second adjustment to the spark timing value to satisfy a threshold engine knock level;
adjusting the spark timing value using one of the first and second adjustments;
determining a third adjustment for the spark timing value to, after adjusting the spark timing value using one of the first and second adjustments, adjust the spark timing value to approximately a target spark timing value; and
determining, based on at least the target spark timing value and maintaining at least one of the threshold $NO_x$ level and the threshold engine knock level, an adjusted air-to-fuel ratio.

17. The method of claim 16, further including the step selecting one of the first and second adjustments for the step of adjusting the spark timing value, the selection of one of the first and second adjustments being based on which of the first and second adjustments can provide a largest retardation of a combustion event.

18. The method of claim 17, wherein the step of determining the first adjustment includes determining a difference between a measured or determined NOx level and the threshold $NO_x$ level.

19. The method of claim 18, wherein the step of determining the second adjustment includes determining a difference between a measured or determine engine knock level and the threshold engine knock level.

20. The method of claim 19, wherein the step of determining the adjustment to the spark timing value includes comparing a measured spark timing value to the target spark timing value.

* * * * *